United States Patent [19]

Huber et al.

[11] Patent Number: 4,482,180
[45] Date of Patent: Nov. 13, 1984

[54] BUMPER FOR MOTOR VEHICLES

[75] Inventors: Guntram Huber, Aidlingen; Wolfgang Fischer, Leinfelden; Fritz Haeberle, Sindelfingen; Horst Kleiner, Stuttgart; Daniel Riechers, Sindelfingen; Wolfgang Klie, Korntal; Johann Tomforde, Sindelfingen, all of Fed. Rep. of Germany

[73] Assignee: Daimler-Benz Aktiengesellschaft, Fed. Rep. of Germany

[21] Appl. No.: 393,885

[22] Filed: Jun. 30, 1982

[30] Foreign Application Priority Data

Jun. 30, 1981 [DE] Fed. Rep. of Germany ....... 3125687

[51] Int. Cl.³ ............................................. B60R 19/08
[52] U.S. Cl. .................................... 293/120; 293/136
[58] Field of Search ............... 296/102, 120, 121, 132, 296/136

[56] References Cited

U.S. PATENT DOCUMENTS

| 3,721,433 | 3/1973 | Sobel | 293/136 |
| 3,869,164 | 3/1975 | Schwenk | 293/120 |
| 3,897,095 | 7/1975 | Glance | 293/120 |
| 3,933,387 | 1/1976 | Salloum | 293/120 |
| 4,106,804 | 8/1978 | Scrivo | 293/136 |
| 4,350,378 | 9/1982 | Wakamatsu | 293/120 |

FOREIGN PATENT DOCUMENTS

| 1045183 | 12/1978 | Canada | 293/136 |
| 1480035 | 3/1970 | Fed. Rep. of Germany | 293/136 |
| 2457676 | 6/1976 | Fed. Rep. of Germany | 293/121 |
| 2853244 | 6/1980 | Fed. Rep. of Germany | . |
| 2934458 | 3/1981 | Fed. Rep. of Germany | 293/121 |

Primary Examiner—Robert B. Reeves
Assistant Examiner—Dennis H. Pedder
Attorney, Agent, or Firm—Craig & Burns

[57] ABSTRACT

A bumper arrangement for a motor vehicle, especially an automobile, with the bumper arrangement including a bending-resistant support mounted on a part integrally secured with the motor vehicle. A front of the support accommodates a preferably replacable energy absorber composed of at least one component. The energy absorber itself is partially surrounded by a shell made of a viscoelastic material. The shell is connected to a covering part of viscoelastic material having a downwardly projecting skirt segment and an upwardly extending segment which is extended in a direction toward adjoining body portions of the motor vehicle. A front side of the support is made essentially flat and is adapted to receive a middle segment of the covering part. For attachment of the shell to the covering part locally discontinuous guide grooves are provided in an area of the upper segment and skirt segment, the guide grooves being adapted to lockingly accommodate the appropriate projections or ends of the shell.

14 Claims, 7 Drawing Figures

FIG.1
FIG.2
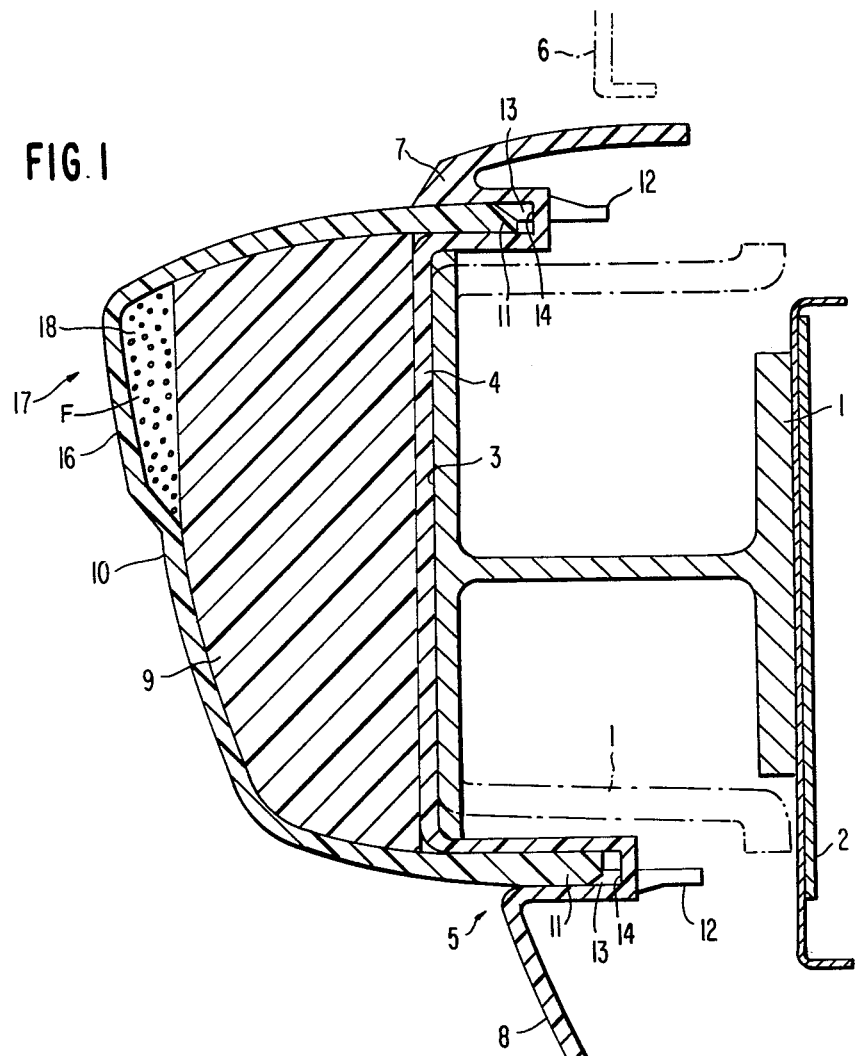
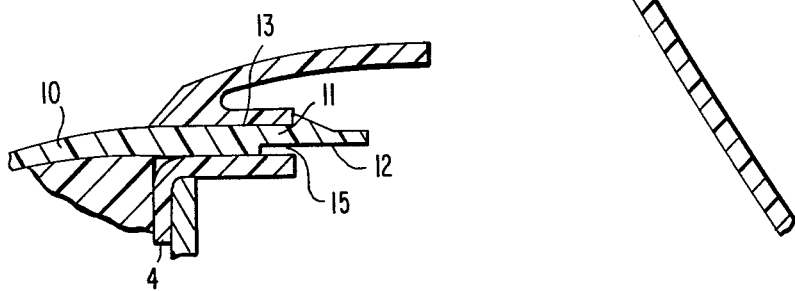

BUMPER FOR MOTOR VEHICLES

BACKGROUND OF THE INVENTION

The present invention relates to a bumper arrangement for motor vehicles, especially automobiles, with the bumper arrangement including a bending-resistant support mounted on at least one integrally formed part of the vehicle and a preferably replaceable energy absorber having at least one part mounted to the support. The energy absorber is partially surrounded by a shell made of a viscoelastic material, which shell is connected with a downwardly extending skirt section and an upper segment extending toward an adjoining portion of the body of the vehicle, the skirt section and upper segment likewise made of a viscoelastic material.

In known bumper arrangements, for example, Offenlegungsschrift No. 2,853,244, a bumper arrangement is provided having a support which is of a U-shaped profile opening in a direction of the energy absorber. A disadvantage of this proposed construction resides in the fact that, since the energy absorber can only be compressed under the influence of considerable force, installation difficulties may occur because of an excess height of the energy absorber resulting from high manufacturing tolerances or upon a distortion of the energy absorber.

In another known bumper arrangement, for example, Offenlegungsschrift No. 2,934,458, it is proposed to apply a covering part made of a viscoelastic material to a bumper by means of locking connections; however, in this proposed construction, no energy absorber is connected to the covering part and the mounting is effected directly to the bending resistant support. In this covering part the direction of the engaging free ends provide for tolerance variations.

SUMMARY OF THE INVENTION

The aim underlying the present invention essentially resides in providing a bumper arrangement for motor vehicles which is adapted to be equipped with an energy absorber and a bending resistant support with the absorber being fixedly secureable, even with an excessive height dimension and in a distorted state, by a protective shell surrounding the absorber at least partially and protecting the same against the influence of weather without adversely affecting the overall appearance of the bumper by differing dimensions of the energy absorber.

In accordance with advantageous features of the present invention, a front side of the bending resistant support of the bumper includes an impact area made essentially flat and adapted to accept or accommodate a middle segment of a covering part which connects a skirt segment with an upper segment forming one piece therewith.

Advantageously, the middle segment may be provided with transitional areas between the adjoining skirt segment and upper segment. The transitional areas each preferably including a rearwardly staggered guide groove open toward the front, into which groove the ends of the shell may engage and be mounted so as to project in a longitudinal direction of the vehicle. A bottom of each guide groove may be locally cut away at appropriate points so as to permit locking elements extending from the ends of the shell to pass therethrough.

Advantageously, in accordance with the present invention, the middle segment has a surface, opposite the essentially flat side which engages the supporting front side of the support, forming a favorable receiving surface for the energy absorber. The energy absorber can be preassembled in the shell, so that, in the course of subsequent mounting procedures, the ends of the shell that engage the guide grooves may be automatically aligned so that the locking process may take place at the end of the overall mounting procedure.

In the instant bumper arrangement where an application of the impact forces takes place at a position displaced vertically with respect to the supporting surface of the bending-resistant support and the part which is integral with the motor vehicle, no pivoting of the support about the transverse axis of the vehicle can occur if the energy absorber is displaced rearwardly behind the projecting area of the shell which is near the point or area of impact. Thus, the gap between the shell and absorber creates, in case of a load, a large area of initial support on the energy absorber only after the gap has been closed. The resultant or amount of force of the impact not absorbed is transmitted to the part which is integral with the vehicle by way of the mounting base of the bending resistant support.

In order to counteract the deformation phenomenon in the area of the shell which is located forwardly of the gap as a result of temperature influences, the shell can abut the energy absorber in a vicinity of the gap by means of slightly deformable strips which project from the back of the shell. Therefore, it is advantageous for the slightly deformable strips in the shell to be formed as an integral element.

Another possibility in accordance with the present invention for eliminating temperature-produced deformations in the segment of the shell which is located forwardly of the gap resides in filling the gap with a material which is incapable of any significant energy absorption when the gap is compressed such as, for example, soft open-cell foam.

In a bumper in which a height of the integral portion of the vehicle is less than a height of an adjoining bending resistance support and there is an offset between the two parts, it is possible, in accordance with the present invention, to ensure a satisfactory introduction of force when the height of the energy absorber in a vicinity of the offset is reduced to the point where the resultant of the impact force on the effective cross section of the energy absorber is located within a mounting base of the support on the part which is integral with the motor vehicle.

OBJECTS OF THE INVENTION

Accordingly, it is an object of the present invention to provide a bumper arrangement for motor vehicles which avoids, by simple means, shortcomings and disadvantages encountered in the prior art.

Another object of the present invention resides in providing a bumper arrangement for motor vehicles which enables the installation thereof at relatively low costs.

Yet another object of the present invention resides in providing a bumper arrangement for motor vehicles which is capable of accommodating energy absorbing means in a secure manner while compensating for manufacturing tolerances.

A still further object of the present invention resides in providing a bumper arrangement for motor vehicles having a construction which greatly facilitates the mounting on the motor vehicle.

Another object of the present invention resides in providing a bumper arrangement for motor vehicles which readily compensates for temperature produced deformations.

These and other objects, features, and advantages of the present invention will become more apparent from the following description when taken in connection with the accompanying drawings which show, for the purpose of illustration only, several embodiments in accordance with the present invention, and wherein:

FIG. 2 is a cross sectional detailed view of an upper locking arrangement of the bumper arrangement of FIG. 1;

Figure 1A:
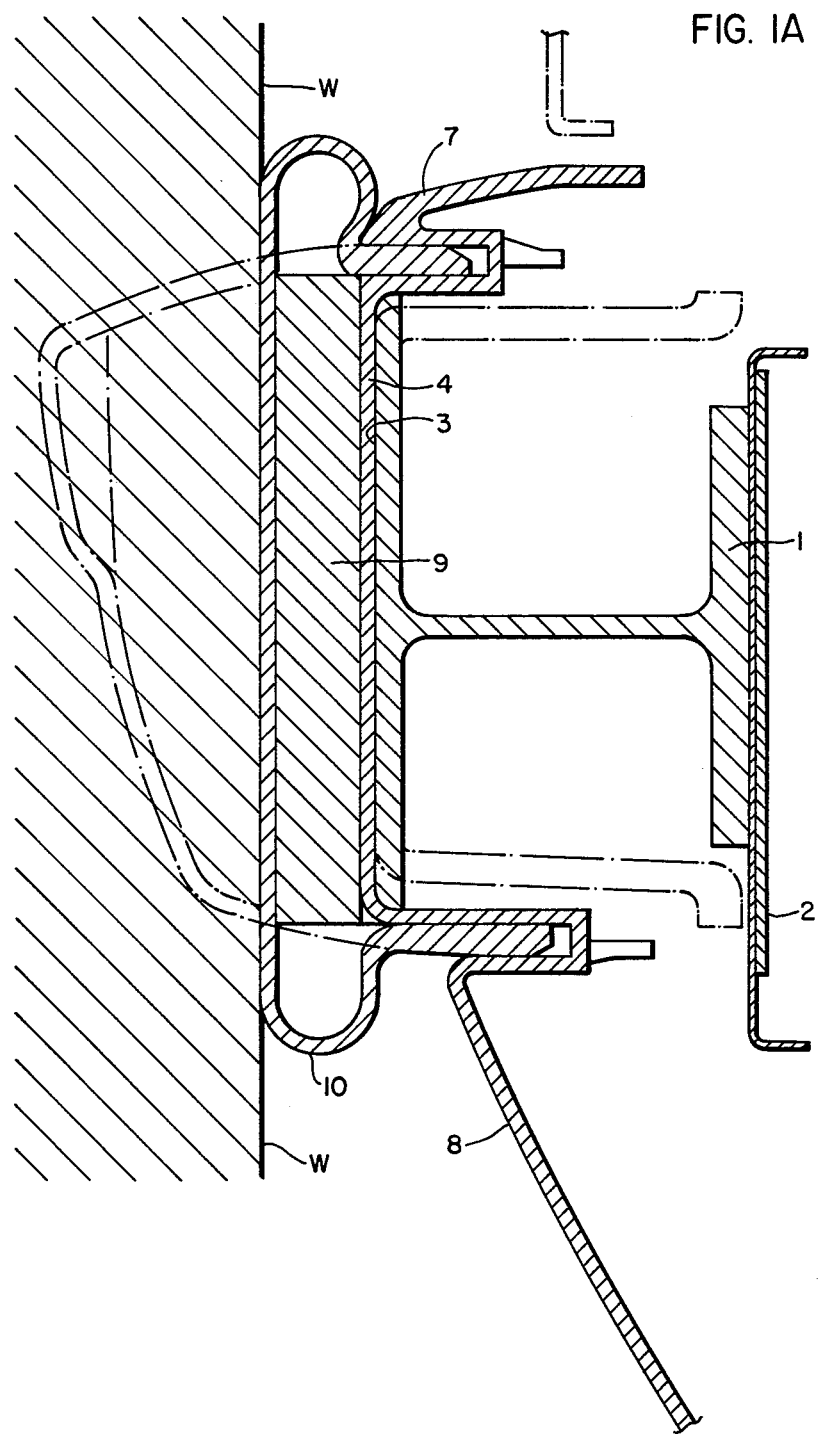
FIG. 1 is a cross sectional view of a first bumper arrangement, constructed in accordance with the present invention, having a shell tapering in a downward direction.
Figure 3:
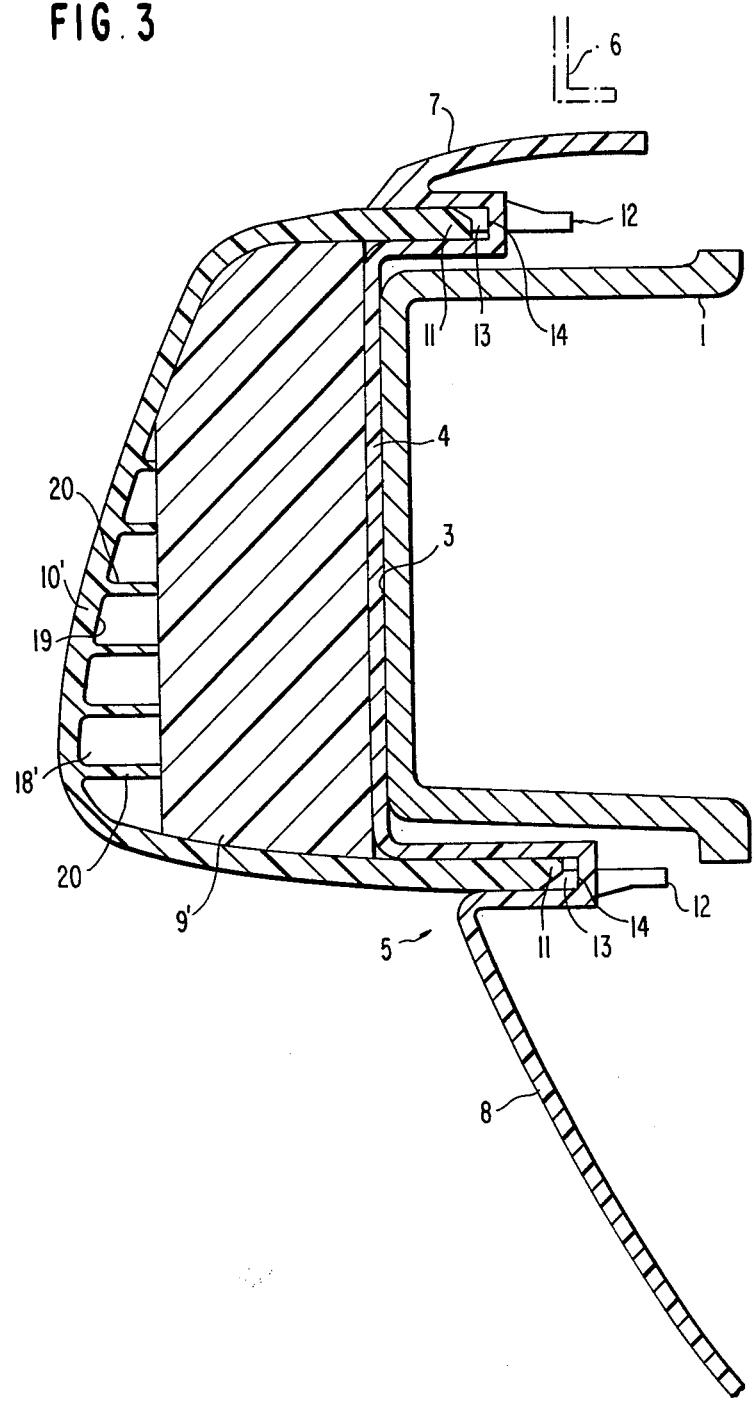
FIG. 3 is a cross sectional view through another bumper arrangement, constructed in accordance with the present invention, having a shell tapering in an upward direction.
Figure 3A:
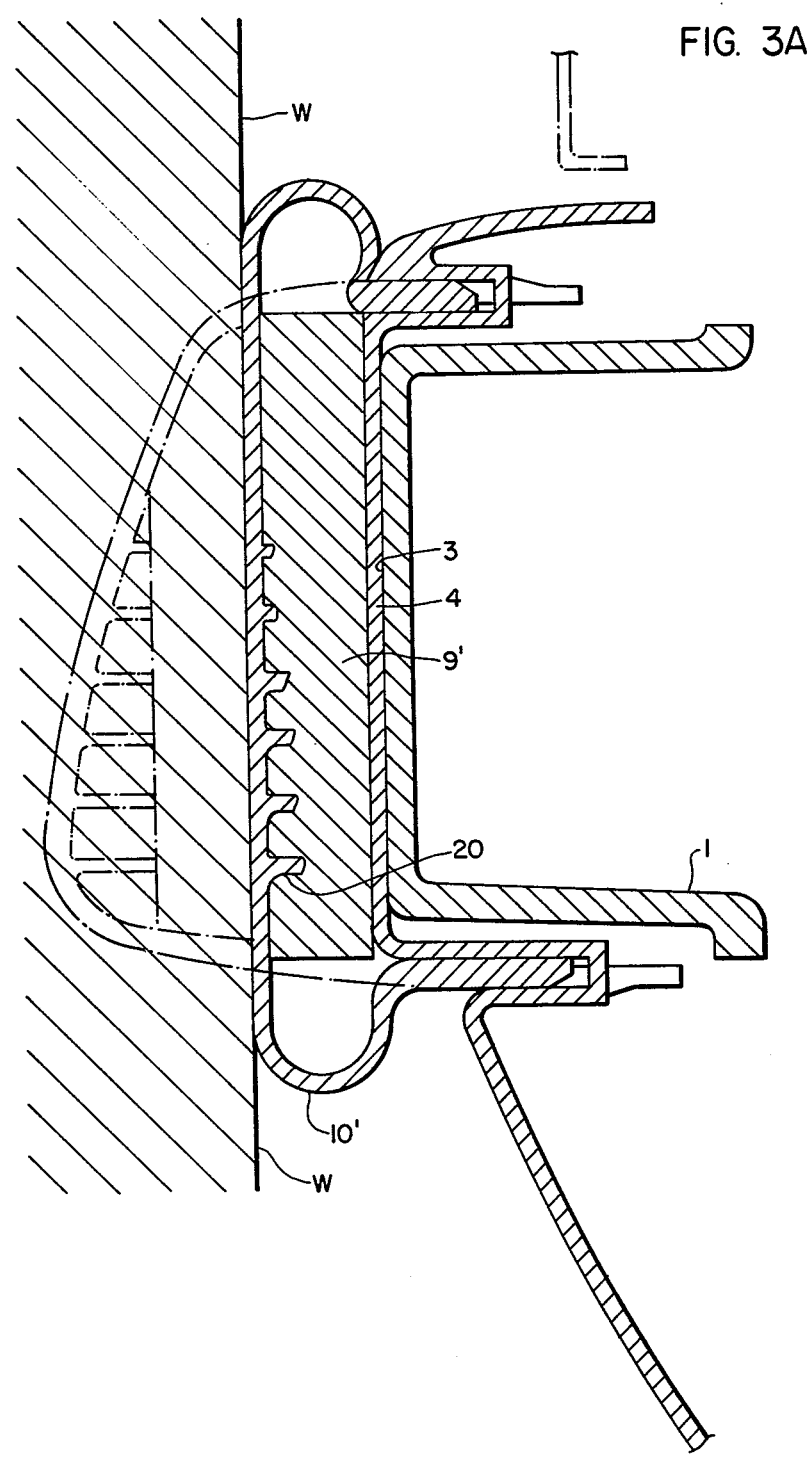
Figure 4:
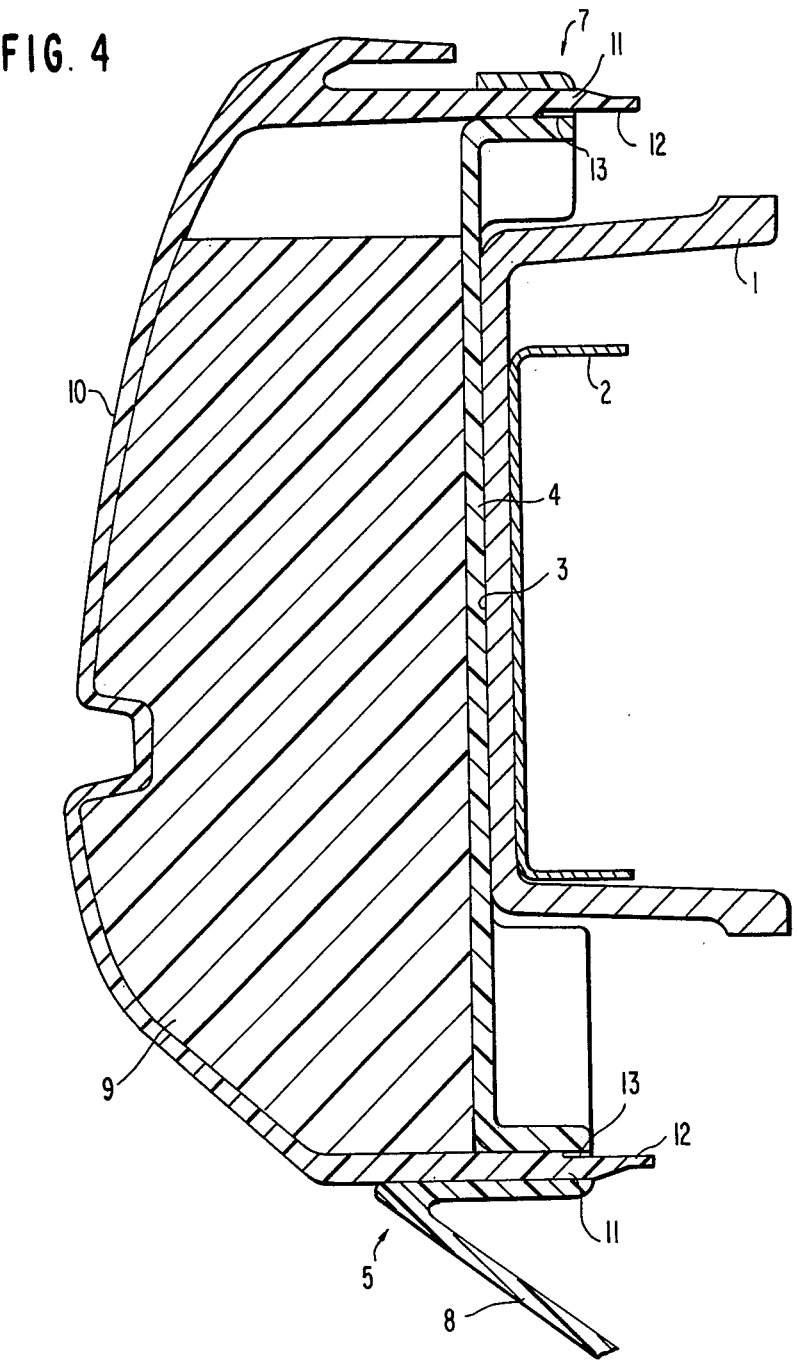
FIG. 4 is a further embodiment of a bumper arrangement in accordance with the present invention wherein a height of an integral supporting portion of the vehicle is less than a height of an adjacent bending resistant support, with the part and support being arranged staggered with respect to each other.
Figure 4A:
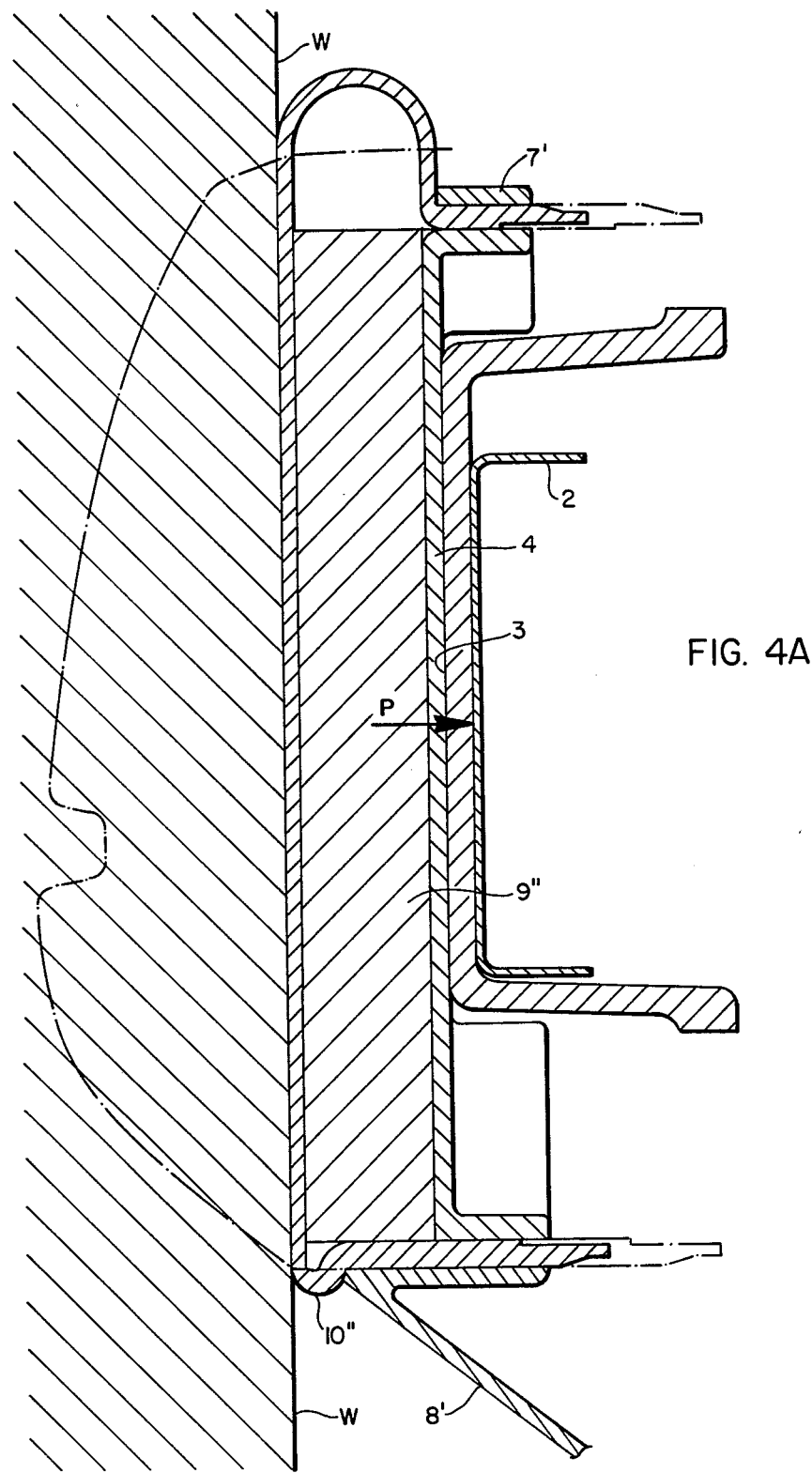

FIGS. 1A, 3A, and 4A are views of the bumper arrangements of FIGS. 1, 3, and 4, respectively, upon impact by an object W.

Referring now to the drawings wherein like reference numerals are used throughout the various views to designate like parts and, more particularly, to FIG. 1, according to this figure, a bumper shell includes a bending-resistant support 1 having a substantially I shape or, as shown in phantom line, a U-shape. The bending-resistant support 1 is releasably mounted in a manner, not shown in greater detail, to a part 2 which is integral with the motor vehicle and which may, for example, be constructed as a cross member that links the part 2 with longitudinally extending members of the motor vehicle.

The support 1 includes a flat front side 3, with a middle segment 4 of a covering part 5, composed of a viscoelastic material, abutting the flat front side 3. An upper segment 7, extending in a direction toward adjacent car body portions 6, and a skirt segment 8, extending generally downwardly adjoin the middle segment 4 of the covering part 5. An energy absorber 9 composed of, for example, foam, is mounted forwardly of the middle segment 4, with the absorber being surrounded partially by a shell 10 of viscoelastic material. Locking elements 12, formed at the ends 11 of the shell 10, extend transversely of the vehicle, and at the beginning of a mounting process for the shell 10 on the covering part 5, engage guide grooves 13. The guide grooves 13 open in a direction facilitating engagement by the ends 11 of the shell 10 and are disposed in a transitional area of the middle segment 4 toward the upper segment 7 and skirt segment 8. As the shell 10 is pushed further on, there is an automatic alignment of the locking elements 12 and the ends 11 relative to the guide grooves 13, so that at the end of the fastening process, as shown most clearly in FIG. 2, the locking elements 12 enter associated openings 15 provided in the bottom 14 of each guide groove 13 and grip behind the openings in a locking fashion.

As shown in FIG. 1, the shell 10 extends downwardly generally parallel to the skirt segment 8 and is provided with a bead 16 which is staggered or projected forwardly, with the bead forming an area generally designated by the reference numeral 17 of the shell 10 which is, in most cases, the area or point of impact. In order to prevent the occurrence of forces, in the event of an impact, which would tend to tilt the support upwardly and rearwardly, the energy absorber 9 is displaced rearwardly from the area of the bead 17 near, i.e., where, the point of impact usually occurs, so as to define or delimit a gap 18 which may, for example, be filled, to retain its shape, with a foam F which does not have any significant energy absorbing capability, e.g., a soft open-cell foam. Thus, after the gap 18 is closed (see FIG. 1A), it is possible for an area wise reception and absorption of force to take place, whereby any resulting forces transferred within the mounting base of the support 1 will be transmitted to the part 2 integral with the motor vehicle.

As seen in FIG. 1A, the flexibility of the viscoelastic shell 10, when encountering an object, permits the bead 17 to collapse and the forces due to the impact of the object W on the bumper to be transmitted and absorbed by the energy absorber 9. Any forces, as will be readily apparent, which exceed the energy absorption capability of the energy absorber 9, will be transmitted through the bending resistant support 1 to the integral part of the vehicle 2. Clearly, object W first encounters bead 16 which collapses to thereby permit impact forces from object W to engage an increasingly greater area of the impact absorber as the impact absorber deforms.

As shown in FIG. 3, a gap 18', producing the same effect as the gap 18, is provided wherein a path or direction of extension of a shell 10' is opposite to the direction of extension of the skirt segment 8. Strips 20, integrally formed with and projecting away from a back-surface 19 of the shell 10', are constructed to function in the manner of foam F so as to be easily deformable and abut an energy absorber 9', corresponding to the energy absorber 9, so as to ensure the retention of the shape of the shell 10' in a vicinity of the gap 18'.

FIG. 3A is a depiction similar to FIG. 1A wherein the bumper embodiment shown in FIG. 3 is shown in a collapsed condition due to forces imparted thereto by object W. As seen therein, the flexible strips 20 have substantially deformed as the forces are transmitted to and absorbed by the energy absorber 9'.

FIG. 4 provides an example of a bumper arrangement wherein a height of the part 2 which is integral with the vehicle is less than a height of the adjoining bending-resistant support 1, and wherein there is also a displacement between the two parts so that if an energy absorber 9" which completely fills a shell 10" in a horizontal direction is provided, there would be a danger in the event of an impact that the part 2 would twist. To eliminate possible damage due to this source, the height of the energy absorber 9" in an area near the displacement between the two parts, is reduced to the point where the resultant of the impact force of the effective remaining segment of the energy absorber 9" is located, if possible, within the mounting base of support 1 on the part 2 integrally secured with the vehicle. As with the previous constructions, the arrangement of FIG. 4 includes an upper segment 7' and a skirt segment 8' adjoining a middle segment 4 of a covering part 5. The skirt segment 8' and upper segment 7' adjoining the middle segment 4 are formed integrally therewith.

FIG. 4A shows the collapse of the bumper is depicted in FIG. 4, due to forces imparted thereto by encountering object W, in a manner generally similar to the showings in FIGS. 1A and 3A. Again, any force, i.e., resultant force, which would exceed the absorption capability of the energy absorber 9″ would be transmitted to the integral part 2 of the vehicle, the forces being depicted by arrow P.

While We have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A bumper arrangement for motor vehicles comprising support means being adapted to abut at least one integral part of a vehicle, energy absorber means associated with the support means for absorbing forces impacting thereon, shell means of a viscoelastic material fixed relative to and for at least partially surrounding the energy absorber means a front side of the support means being made essentially flat, cover means including a middle segment disposed proximate the front side of the support means and guide groove means for cooperating with the shell means, the cover means including a skirt segment extending in a downward direction and an upper segment, the skirt segment and upper segment adjoining the middle segment and formed integrally therewith, said guide groove means formed in a transitional area between the upper segment and middle segment and in a transitional area between the skirt segment and middle segment for receiving ends of the shell means therein, each guide groove means opening in a direction facilitating the receipt therein of a respective end of the shell means, opening means provided in each of the guide groove means for cooperatively receiving a locking means therethrough, locking means extending from the shell means for securing the shell means to the cover means by being cooperatively received by an opening means.

2. A bumper arrangement according to claim 1, wherein the upper segment is arranged such that at least a portion thereof extends in a direction of an adjoining body portion of the vehicle, and wherein the skirt segment are formed of a viscoelastic material.

3. A bumper arrangement according to claim 2, wherein the shell means extends in a downward direction approximately in parallel to the skirt segment.

4. A bumper arrangement according to one of claims 1, 2, or 3, wherein the shell means includes a forwardly projecting bead means, the energy absorber means is recessed in an area behind the bead means so as to define a gap between the energy absorber means and the bead means, whereby, upon an application of an impact force on the bumper arrangement, the gap is compressed after which a large area of support is provided on the energy absorber means with resultant impact forces being located within a portion of the support means juxtaposed the integral part.

5. A bumper arrangement according to claim 4, wherein the gap is filled with a material of low energy absorbing capability for retaining the shape thereof.

6. A bumper arrangement according to claim 5, wherein the low energy absorbing material is an open-cell foam.

7. A bumper arrangement according to one of claims 1 or 2, wherein the shell means tapers upwardly from a lower end thereof and inwardly in a direction toward the motor vehicle, and wherein the skirt segment and upper segment are formed of a viscoelastic material.

8. A bumper arrangement according to claim 7, wherein a gap is formed between the shell means and a forward surface of the energy absorber means, and wherein easily deformable strip means project from a back surface of the shell means and abut the forward surface of the energy absorber means for retaining the gap shape, whereby, upon an application of an impact force on the bumper arrangement, the gap is compressed after which a large area of support is provided on the energy absorber means with resultant impact forces being located within a portion of the support means juxtaposed the integral part.

9. A bumper arrangement according to claim 8, wherein the strip means and shell means are integrally formed.

10. A bumper arrangement according to claim 1, wherein a gap is formed between the shell means and a forward surface of the energy absorber means.

11. A bumper arrangement according to claim 8, wherein the gap is filled with a material of low energy absorbing capabilities for retaining the shape thereof.

12. A bumper arrangement according to claim 11, wherein the low energy absorbing material is an open-cell foam.

13. A bumper arrangement according to one of claims 1 or 2, wherein the part integrally secured to the vehicle has a height less than a height of the support means, and wherein a height of the energy absorber means is of a height such that an impact resultant force is disposed within the support means, thereby reducing twist of the integral part of the motor vehicle.

14. A bumper arrangement according to claims 1 or 2, wherein a gap is formed between the shell means and a forward surface of the energy absorber means, and wherein easily deformable strip means project from a back surface of the shell means and abut the forward surface of the energy absorber means, whereby, upon application of an impact force on the bumper arrangement, the gap is compressed after which a large area of support is provided on the energy absorber means with resultant impact forces being located within a portion of the support means juxtaposed the integral part.

* * * * *